June 30, 1925.  
T. J. ENTW'SLE ET AL  
1,544,143  
TANK CAR VALVE  
Filed Oct. 20, 1922　　2 Sheets-Sheet 1
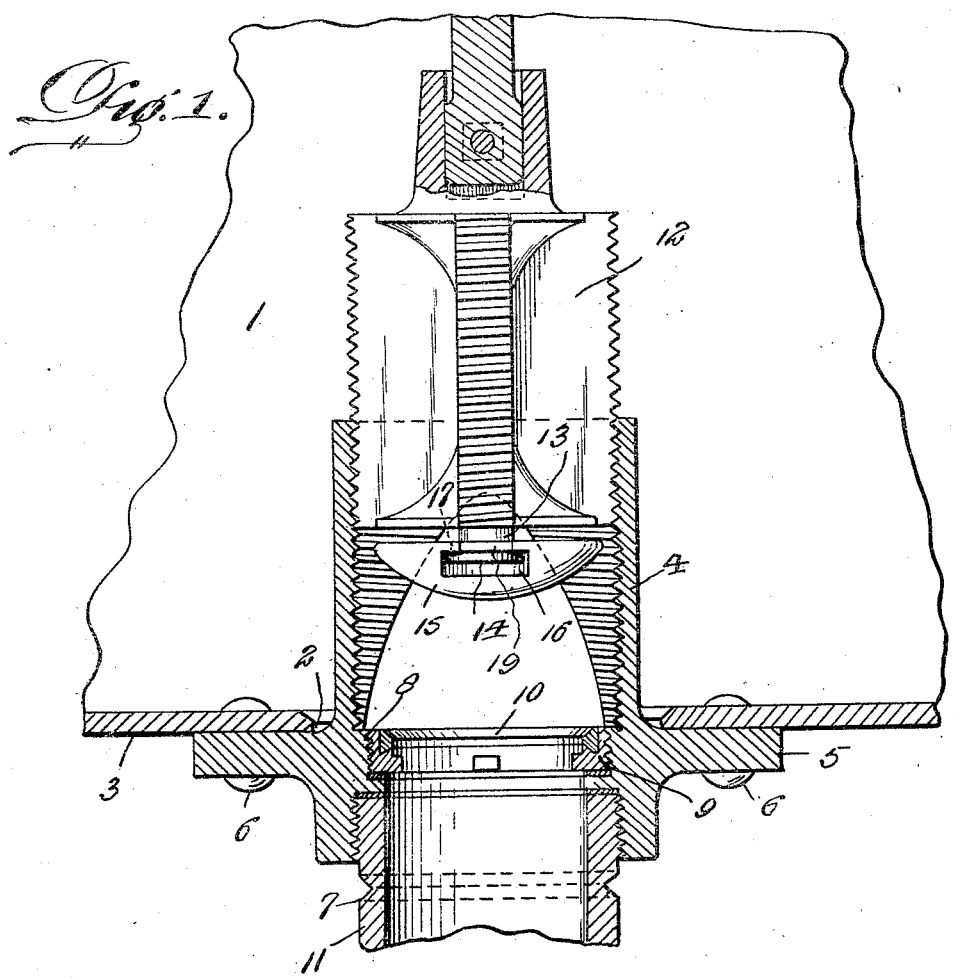
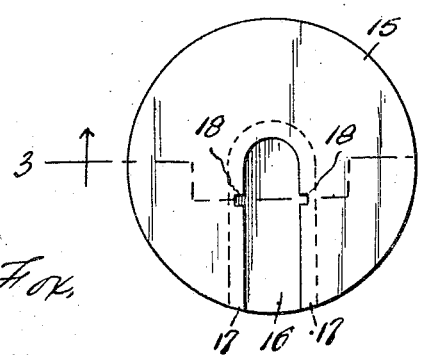
T. J. Entwisle,  
Henry P. O'Mara,  
J. W. Donnelly,  
INVENTORS
WITNESSES
ATTORNEYS.

June 30, 1925. 1,544,143
T. J. ENTWISLE ET AL
TANK CAR VALVE
Filed Oct. 20, 1922 2 Sheets-Sheet 2
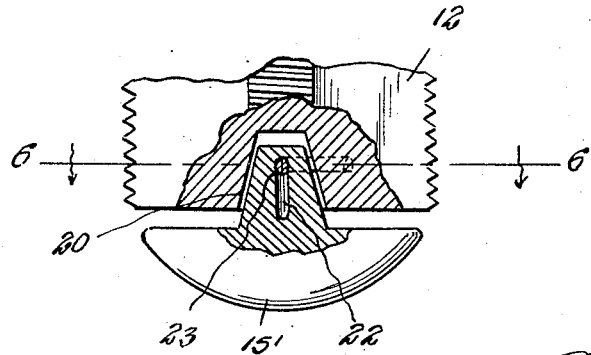
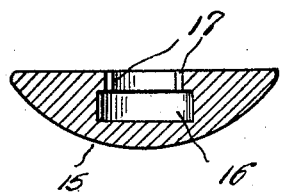
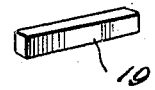
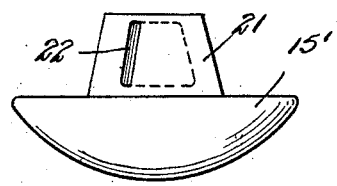
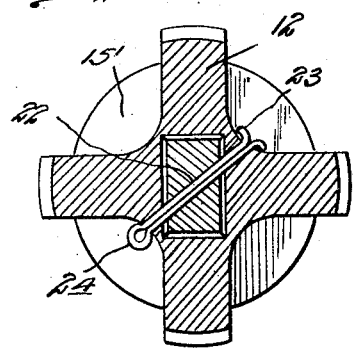
T. J. Entwisle,
Henry P. O'Mara,
J. W. Donnelly
INVENTOR.
WITNESSES
ATTORNEYS.

Patented June 30, 1925.

1,544,143

UNITED STATES PATENT OFFICE.

THOMAS J. ENTWISLE, JOSEPH W. DONNELLY, AND HENRY P. O'MARA, OF NEW ORLEANS, LOUISIANA, ASSIGNORS, BY DIRECT AND MESNE ASSIGNMENTS, OF THREE-FOURTHS TO THE SAID ENTWISLE AND OF ONE-FOURTH TO EDWARD L. MARTIN, OF NEW ORLEANS, LOUISIANA.

TANK-CAR VALVE.

Application filed October 20, 1922. Serial No. 595,850.

*To all whom it may concern:*

Be it known that we, THOMAS J. ENTWISLE, JOSEPH W. DONNELLY, and HENRY P. O'MARA, citizens of the United States, residing at New Orleans, in the parish of Orleans and State of Louisiana, have invented certain new and useful Improvements in Tank-Car Valves, of which the following is a specification.

This invention relates to valves specifically adapted for application to tank cars, and is an improvement upon the valve head and seat per se disclosed in our co-pending applications, Serial Numbers, 572,271 and 572,272, filed July 1st, 1922.

In these co-pending applications, the valve heads are formed upon or otherwise secured rigidly to the valve body or plug and are adapted to move therein in closing the valve. In this type of structure, we have found that the head does not always become evenly or properly seated upon its seat, due to the fact, the valve head and seat are sometimes not properly positioned with respect to each other. If this be the case, the usual brass valve seat will quickly become worn uneven necessitating the regrinding thereof.

In view of the above, the primary object of the invention resides in the provision of a valve, wherein the head is detachably secured to the valve plug or body, and adapted to have a relative up and down sliding movement thereon, and further to have a slight universal pivotal movement thereon for allowing the valve head to be positioned evenly upon its seat, the head itself being allowed to properly locate therein without being wholly directed by the valve body or plug, thus producing what is known as a true ball seat. Further, in view of the sliding connection between the head and body of the plug, the head will be allowed to turn in its seat tending to wipe or grind the seat each time the valve is opened or closed, thus insuring a clean seat each time the valve is opened.

A further object of the invention is the provision of a tank car valve wherein the usual brace seat is detachably secured within the valve casing, thereby allowing the same to be readily renewed at will.

The nature and advantages of the invention will be better understood when the following detailed description is read in connection with the accompanying drawings, the invention residing in the construction, combination, and arrangement of parts as claimed.

In the drawings:

Figure 1—is a fragmentary vertical cross sectional view through the valve, the same being shown as applied to the tank car.

Figure 2—is an enlarged top plan view of the valve head per se.

Figure 3—is a transverse cross sectional view upon the broken line 3—3 of Figure 2, and looking in a direction of the arrows.

Figure 4—is a perspective view of a locking member adapted to be positioned within suitably formed openings in the valve head for retaining the same upon the plug or body of the valve.

Figure 5—is a fragmentary cross sectional view of the valve plug or body, showing a slightly modified form of head carried thereby.

Figure 6—is a transverse cross sectional view upon the line 6—6 of Figure 5, and looking down in the direction of the arrows, and Figure 7 is a side elevational view of the modified form of head shown in Figures 5 and 6.

With particular reference to Figure 1 of the drawings, there is shown a tank car body 1, having a centrally enlarged opening 2 in the bottom wall thereof. Adapted for positioning within the tank car and through the opening 2 in the bottom 3, is a valve casing 4 internally screw threaded as shown. Inwardly of the lower open end of the casing, and beneath the bottom wall of the tank the same has formed thereon an annular flange 5 for securing this valve casing to the bottom of the car by rivets or the like 6. The lower outer end of the casing is screw threaded for receiving the upper screw threaded end of the casing, the interior thereof being reduced and screw threaded as at 8 for receiving therein a screw threaded valve seat retaining ring 9. This retaining ring 9 is channeled at its upper end for receiving a brass or the like valve seat 10, it being understood that the retaining ring 9, is of malleable iron or other similarly hard material.

For screw threaded engagement within the casing 4, is a valve plug or body 12 formed as shown and described in my above mentioned co-pending applications. Centrally formed upon the bottom of this body or plug 12 is a depending neck 13 having an annular-shaped flange 14 formed upon the bottom end thereof, defining a head for this neck. Adapted for detachable engagement upon this neck portion 13, the body or plug 12 is a valve head 15, the outer surface thereof being convex, and the inner surface adjacent the end of the plug being plane. From the center of the head to the outer end thereof is an undercut slot 16 extending transversely thereacross and in the upper plane surface of the valve. This undercut slot 16 is so formed as to provide side shoulders 17 thereabove. As will be clearly understood, the valve head 15 is to be positioned upon the depending neck 13 of the plug in a manner clearly shown in Figure 1, the head 14 of this depending neck portion adapted for engagement within the slot for suitably retaining the head upon the neck in view of the side shoulders 17 and the annular-shaped head 14 of the neck 13. The side edges of this neck adjacent each of the shoulders 17 are plane for preventing any relative turning movement of the head 15 upon its support. As a means for properly securing the head in place, the above mentioned side shoulders 17 are notched as at 18, slightly spaced from the inner ends thereof and receiving a cross pin 19 therein, the pin being clearly shown in Figure 4.

The distance between the adjacent plane surfaces of the plug 12 and head 15 is less than the distance between the head 14 on the neck 13 and the bottom wall of the slot 16, when the valve head is positioned upon the plug member and in view of this construction, it will be readily understood that a downward movement of the plug 12 within the casing 4 will occasion a similar downward movement of the head 15, and allow the same to contact or to engage with the seat 10 before pressure is applied to the head, allowing the same to assume a true ball valve seat therein. Further, it will be understood that pressure is exerted upon the valve head 15 by the plug 12, and not by the head 14 of the neck portion 13 of this plug. In both closing and opening the valve, the head will be allowed several turns upon its seat 10 without being directly effected by the plug 12 for permitting of a wiping or grinding action to the seat.

In the form of the invention shown in Figures 5, 6 and 7 the valve plug or body 12 has centrally formed in the bottom wall thereof, a rectangular wedge-shaped socket 20 for receiving a similarly-shaped vertically projecting leg 21 centrally formed upon the plane surface of the valve head 15'. The dimension of the angular projecting leg 21 of the valve 15 is lesser than the dimension of the socket 20 in the body or plug 12 for permitting of a slight universal pivotal movement of the valve head within the plug. Diagonally disposed through the leg 21 is a vertically extending slot 22 and similarly disposed within the plug 12 and at the opposite side walls of the socket 20 therein are alined openings 23 for receiving the cotter pin 24, through these openings and through the slot 22 for retaining the valve head upon the plug, the formation of the said slot being such as to allow a movement of the head towards and away from the bottom of the plug.

While it is believed that from the foregoing description, the nature and advantages of the invention will be readily apparent, I desire to have it understood that I do not limit myself to what is herein shown and described, and that such changes may be resorted to when desired, as fall within the scope of what is claimed.

What I claim as new is:

1. A valve for tank cars including a valve casing having an annular valve seat, a plug threaded in said casing, a valve head loosely mounted on one end thereof, having a plane surface on one side opposed to a plane surface on the adjacent end of the plug, said plain surfaces being co-extensive with the seat engaging portion of the head, whereby in the movement of the plug to seat the head said head will first move on its connection to fit the seat and be subsequently pressed in firm engagement with said seat by engagement of the plane surfaces for exerting a uniform pressure over the whole valve body.

2. A valve for tank cars including a valve casing having an annular valve seat, a plug threaded in said casing, and a valve head loosely mounted on the plug, said head having a partial spherical seat engaging portion on one side and a plane surface on the other side opposed to a plane surface on the adjacent end of the plug, said plain surfaces being co-extensive with the seat engaging portion of the head.

3. The combination with a valve casing having an annular seat and an internally threaded sleeve extension of substantially larger diameter than said seat, and a plug having threaded cooperation with the sleeve, of a valve head loosely connected with the plug having a seat engaging portion on one side and a plane surface on the other side opposed to a similar plane surface on the adjacent end of the plug.

4. A tank car valve including a valve body having an annular seat and an annular threaded flange extending from the body around the seat, and in concentric relation with respect thereto, a valve plug having a threaded portion for cooperation with the threaded flange, one end of the body having a plane face, and a recess therein, a valve head adapted for cooperation with the seat in the body having a plane face on one side opposed to the face on the end of the plug and adapted for engagement therewith in the seated position of the plug and the head, said valve head having a projection extending into the recess in the plug, and securing means mounted in the plug and extending through the projection for rigidly connecting the head with the plug.

5. A plug for a tank car valve having an annular seat comprising a body having a threaded portion for cooperation with a threaded portion of the valve to produce an axial movement of the plug in the opening and closing of the valve, one end of said body having a plane face, said body being formed with a recess in the end having the plane face, a valve head adapted for cooperation with said seat when the valve is closed, said head having a projection thereon extending into the recess in said body and cooperating with the body to produce a rotary movement of the valve head and a rotation of the body, and means loosely connecting said head with said body, with the projection on said head loosely engaging in the recess of the body.

6. A plug for tank car valves comprising a threaded body member having a plane face on one end and having a recess in the end provided with said plane face, a valve head having a plane face opposed to the face on said body and adapted for contact therewith when the valve is closed, said head having a projection thereon loosely engaging in the recess in the body and adapted to produce a movement of the head in the rotation of the body, and a pin removably mounted in said body adapted for cooperation with said projection for loosely connecting the head to the body.

In testimony whereof we affix our signatures.

THOMAS J. ENTWISLE.
JOSEPH W. DONNELLY.
HENRY P. O'MARA.